(12) United States Patent
Matthies et al.

(10) Patent No.: US 12,219,964 B2
(45) Date of Patent: Feb. 11, 2025

(54) METHOD AND APPARATUS FOR TWIST LINKING TUBULAR CASINGS AND ASSOCIATED SYSTEM FOR STUFFING TUBULAR CASINGS

(71) Applicant: VEMAG Maschinenbau GmbH, Verden (DE)

(72) Inventors: Heiner Matthies, Kalbe (DE); Thomas Zarezki, Ludwigslust (DE)

(73) Assignee: VEMAG Maschinenbau GmbH, Verden (DE)

( * ) Notice: Subject to any disclaimer, the term of this patent is extended or adjusted under 35 U.S.C. 154(b) by 715 days.

(21) Appl. No.: 17/466,329

(22) Filed: Sep. 3, 2021

(65) Prior Publication Data

US 2022/0071220 A1 Mar. 10, 2022

(30) Foreign Application Priority Data

Sep. 4, 2020 (DE) .......................... 102020123206.3

(51) Int. Cl.
*A22C 11/00* (2006.01)
*A22C 11/10* (2006.01)

(52) U.S. Cl.
CPC .................................. *A22C 11/107* (2013.01)

(58) Field of Classification Search
CPC . A22C 11/107; A22C 11/0245; A22C 11/122; B65B 7/12; B65B 9/12; B65B 11/122; A23L 13/65
USPC .......................................................... 452/31
See application file for complete search history.

(56) References Cited

U.S. PATENT DOCUMENTS

| 2,776,449 | A | * | 1/1957 | Cross | .................... | A22C 11/107 |
| | | | | | | 452/47 |
| 2,834,042 | A | * | 5/1958 | Cross | .................... | A22C 11/104 |
| | | | | | | 452/47 |
| 3,115,668 | A | * | 12/1963 | Townsend | .............. | A22C 11/02 |
| | | | | | | 452/45 |
| 3,191,222 | A | * | 6/1965 | Townsend | .............. | A22C 15/00 |
| | | | | | | 452/31 |

(Continued)

FOREIGN PATENT DOCUMENTS

| DE | 295964 A7 | 11/1991 |
| DE | 102020123206 B3 | 7/2021 |

(Continued)

OTHER PUBLICATIONS

European Patent Office, Extended Search Report issued in EP 21194628.0—1005 dated Jan. 24, 2022, 9 pages.

(Continued)

*Primary Examiner* — Richard T Price, Jr.
(74) *Attorney, Agent, or Firm* — Wood Herron & Evans LLP

(57) ABSTRACT

Method and apparatus for twist linking tubular casings for stuffing tubular casings is disclosed. A method for twist linking tubular casings includes twisting a tubular casing such that the number of twists per portion or per group of portions is varied during the processing of a tubular casing. An apparatus for twist linking tubular casings, which is configured to twist the tubular casings to form portions having a variable number of twists per portion or per group of portions, includes a control unit configured to perform the disclosed method for twist linking tubular casings.

9 Claims, 9 Drawing Sheets

(56) References Cited

U.S. PATENT DOCUMENTS

| | | | | |
|---|---|---|---|---|
| 4,956,893 | A | * | 9/1990 | Townsend ............ A22C 11/107 53/550 |
| 4,965,910 | A | * | 10/1990 | Townsend .......... A22C 13/0003 493/299 |
| 4,972,548 | A | * | 11/1990 | Townsend .......... A22C 13/0003 426/138 |
| 5,019,012 | A | * | 5/1991 | Townsend .......... A22C 13/0003 452/46 |
| 5,092,813 | A | * | 3/1992 | Kasai ................... A22C 11/107 452/51 |
| 5,951,391 | A | * | 9/1999 | Hergott ................. A22C 11/10 452/31 |
| 6,050,888 | A | * | 4/2000 | Nakamura ............. A22C 11/02 452/47 |
| 6,482,079 | B1 | * | 11/2002 | Nakamura ........... A22C 11/107 452/46 |
| 6,514,134 | B1 | | 2/2003 | Krompholz et al. |
| 7,140,958 | B2 | | 11/2006 | Reutter et al. |
| 2005/0221743 | A1 | * | 10/2005 | Reutter ................ A22C 11/107 452/51 |
| 2022/0071220 | A1 | | 3/2022 | Matthies et al. |

FOREIGN PATENT DOCUMENTS

| | | |
|---|---|---|
| EP | 0395177 A2 | 10/1990 |
| EP | 1095569 A2 | 5/2001 |
| EP | 1297747 B1 | 8/2004 |
| EP | 1582098 A1 | 10/2005 |
| EP | 3964446 A1 | 3/2022 |
| WO | 9605733 A1 | 2/1996 |
| WO | 9817119 A1 | 4/1998 |

OTHER PUBLICATIONS

Albert Handtmann Maschinenfabrik GmbH & Co.; Betriebsanleitung Originalsprache Vakuumfullmaschine dated Mar. 2014; 170 pages.

Albert Handtmann Maschinenfabrik GmbH & Co.; Prufprotokoll fur Machine VF620 Nr. 38610 dated Nov. 17, 2016; 9 pages.

Amtsblatt Der Europaischen Union; Richtlinie 2006/42/EG Des Europaischen Parlaments Und Des Rates dated May 17, 2006; 63 pages.

Albert Handtmann Maschinenfabrik GmbH & Co.; EG-Konformitatserklarung im Sinne der EG-Richtlinie Maschinen 2006/42/EG, Anhang II, 1A dated Apr. 1, 2016; 1 page.

* cited by examiner

METHOD AND APPARATUS FOR TWIST LINKING TUBULAR CASINGS AND ASSOCIATED SYSTEM FOR STUFFING TUBULAR CASINGS

CROSS-REFERENCE TO RELATED APPLICATIONS

This application claims priority to German Patent Application No. 102020123206.3 filed Sep. 4, 2020, with the same title listed above. The above-mentioned patent application is incorporated by reference herein in its entirety.

TECHNICAL FIELD OF THE INVENTION

The invention relates to a method for twist linking tubular casings. The invention further relates to an apparatus for twist linking tubular casings and to an associated system for stuffing tubular casings.

BACKGROUND OF THE INVENTION

In prior art methods and devices for producing sausages, synthetic or natural gut casings are stuffed with meat emulsion and portioned with the help of a twist linking device; other types of food mass are also stuffed into a casing in the same way. The food mass is generally provided in a stuffing machine. In prior art methods, a twist point separating the individual sausage portions from one another is produced in the gut casing by means of a twist linking device and a portioning device.

Such portioning devices are often referred to as length portioning equipment, in which portions of sausages having the same volume or the same length are produced. An example of such length portioning equipment consists substantially of two spaced-apart circulating chains or belts that run alongside each other at the same speed in a conveying direction in sections in a conveying area and that guide the stuffed gut casing in an intermediate space formed between the two chains or belts.

At intervals approximately equal to the length of a sausage, the chains or belts have laterally projecting dividers fixed to them, which constrict the stuffed gut casing at an engagement point or constriction point. Due to rotational movement of the stuffed casing about its longitudinal axis, and in combination with the engagement of the dividers at the engagement point, the rotation of the casing is reduced in the region of the engagement point, and a twist point forms. By producing a further twist point at a different location in the further course of the process, portions and thus separable sausages are produced.

In twist linking devices known from the prior art, the number of twists can be set to a fixed value. This parameter is typically a compromise between creating durable twists and consuming as little gut as possible. The amount of gut consumed correlates directly in most cases with the chosen number of twists.

The disadvantage of this approach known from the prior art is that, depending on the chosen number of twists, either a large amount of gut is used or there is a greater likelihood that the twist points do not have the required durability, particularly at the first and second twists when a tubular casing is processed.

Therefore, it would be desirable to provide a method and an apparatus that overcomes the disadvantages identified in the prior art. In particular, it would be desirable to provide a method and an apparatus that reduces the amount of gut consumed and simultaneously provide highly durable twists.

SUMMARY OF THE INVENTION

According to embodiments of the invention, the object is achieved, in a method of the kind initially specified, by the step of twisting the tubular casing in such a way that the number of twists per portion or per group of portions is varied during the processing of a tubular casing.

The invention makes use of the discovery that it is possible to save on the amount of gut used, not by setting the number of twists during the processing of a single tubular casing to a constant value as known from the prior art, but rather by varying the number of twists during the processing of a single casing comprising a plurality of portions having a plurality of twist points. It has been found, in particular, that in order to achieve durable twists when processing a tubular casing, it is advantageous to have different numbers of twists, depending on the respective portion being processed. For example, it has been found that less durable twists result in some tubular casings at the beginning and the end of a string of sausages, whereas no problems with durability arise in the middle of a string of sausages for the same number of twists.

By varying the number of twists during the processing of a single casing, this discovery can now be taken into account and the number of twists increased selectively, for example at the beginning and at the end of a string of sausages produced from the tubular casing, whereas a smaller number of twists in the middle of the string is sufficient to produce sufficient strength.

Because the number of twists corresponds directly to the consumption of material, in particular the amount of gut consumed, it is possibly to save material, in particular gut material, by varying the number of twists during the processing of a single tubular casing. Depending on the portion to be produced, this saving can amount to about 3% or more, compared to when a constant number of twists is used, as known from the prior art.

According to a preferred embodiment of the invention, the method also comprises the step of providing an apparatus, in particular a twist linking apparatus, which is configured to twist the tubular casings to form portions, in particular sausages, having a variable number of twists per portion or per group of portions.

The invention is developed by varying the number of twists per portion or per group of portions in a range from 0.5 twists to 15 twists, in particular 1.5 twists to 2.5 twists. The range in question has proved to be particularly suitable for producing durable twists according to the respective portion being processed, i.e., twisted. For example, to produce the first and last portions from a tubular casing, a larger number of twists, about 2.5 twists, may be chosen, and for those portions in the middle of the string of sausages, 1.5 twists may be sufficient and save material.

According to a preferred embodiment of the invention, the number of twists is varied in such a way that a first sequence of twist operations is performed with a first number of twists and a second sequence of twist operations is performed with a second number of twists. Such variation in the number of twists has proved to be particularly suitable for gut-saving processing of tubular casings. For example, the first sequence may contain a larger number of twists that the second sequence. In this case, the first sequence could be used when the processing of a tubular casing begins, and also at the end of processing, for example, in order to ensure that the twists in these areas have the required durability. In the remaining area, a smaller number of twists may be sufficient to achieve twists of sufficient strength and durability, thus allowing gut material to be saved.

The first sequence preferably runs immediately after the processing of a tubular casing begins and is followed by the second sequence. In this way, different requirements for the number of twists needed to achieve a durable twist can be taken into account, depending on the level of processing in relation to the portions of the tubular casing.

According to a preferred development of the invention, when the processing of a tubular casing ends, the first sequence runs again, or one or more further sequences each having a specific number of twists per further sequence run. This takes account of the fact that an adjusted number of twists may also be advantageous at the end of processing a tubular casing.

The invention is developed by the number of twists in the first sequence being 0.5 twists to 15 twists, in particular 1.5 to 3.5 twists. The respective number of twists has proved to be advantageous particular for areas of application where greater demands are made with regard to the durability of the twists or where a larger number of twists in advantageous due to the degree of processing, for example at the end and at the beginning of processing a tubular casing.

The number of twists in the second sequence is preferably 0.5 twists to 15 twists, in particular 1.5 to 3.5 twists. The respective range is particularly effective when sufficient durability of the twist can be achieved by means of the described number of twists, while it is possible at the same time to save gut material in comparison with the number of twists in the first sequence.

According to a preferred development of the invention, the first sequence runs during the processing of the first and/or last 1% to 15%, in particular 5%, of the portions, in relation to the total number of portions in a tubular casing. The respective range has proved to be particular suitable for varying and in particular for increasing the number of twists, in order to increase the durability of the twists in an effective manner.

According to an alternative preferred embodiment of the invention, the first sequence runs for the first and/or last 5 to 15, in particular 10 portions. Depending on the type of tubular casing to be stuffed, adjustment of the number of twisting operations can also be in relation, alternatively, to an absolute value range, for example about 5 to 15, in particular 10 twisting operations.

According to an alternatively preferred embodiment of the invention, the second sequence runs immediately after the processing of a tubular casing begins and is followed by the first sequence. The second sequence preferably runs again when the processing of a tubular casing ends. According to this alternative embodiment, the number of twists is reduced when the processing of a tubular casing begins and ends and is increased in the region therebetween. Such a procedure may be advantageous for individual applications.

According to another alternatively preferred embodiment of the invention, the first sequence and the second sequence run alternately, in particular with multiple alternations. It has been found that such an alternating sequence, in particular such a sequence with multiple alternations, is advantageous for some applications.

According to a preferred embodiment of the invention, a transition region in which the number of twists transitions linearly or non-linearly from the number of twists in the first sequence bordering the transition region to the number of twists in the second sequence bordering the transition region is arranged between two sequences. In that respect, the respective features of the method can ensure that there is not an abrupt jump from the number of twists in a first sequence to the number in a neighbouring sequence, but a transition, in particular. This transition may be linear or non-linear and may relate to a variable number of twist operations. For example, the transition region can extend to a whole number of twist operations, such as 5 twist operations, or can also be expressed as a percentage of the total number of twist operations, for example 2% of the twist operations.

The method is developed by the step of defining by means of a user interface a series of twisting sequences and/or the number of twists within the sequences.

According to an alternative embodiment, the method comprises the steps of defining a number of twists; defining a number of additional twists; defining for what number of twist operations the additional twists are to be carried out at the beginning of processing a tubular casing; defining for what number of twist operations the additional twists are to be carried out at the end of processing a tubular casing; performing the twists in accordance with the defined parameters.

The invention has been described above with reference to a method for twist-linking tubular casings. In a further aspect, the invention relates to an apparatus for twist linking tubular casings, which is configured to twist-link the tubular casings to form portions, in particular sausages, having a variable number of twists per portion or per group of portions, wherein the apparatus has a control unit.

The invention achieves the initially specified object in respect of the apparatus for twist linking tubular casings by the control unit being designed and configured to perform the method according to one of the above embodiments. The apparatus for twist linking tubular casings utilizes the same advantages and preferred embodiments as the method according to the invention. Reference is made in this regard to the observations above, the content of which is incorporated here by reference.

In a further aspect, the object of the invention is achieved by a system for stuffing tubular casings, comprising a stuffing machine for providing a pasty mass, an apparatus for twist linking the stuffed tubular casings, and a portioning device or forming sausage portions, wherein the apparatus for twist linking is designed according to the above embodiment. The system utilizes the same advantages and preferred embodiments as the apparatus according to the invention for twist linking tubular casings, and as the method according to the invention. Reference is made in this regard to the observations above, the content of which is incorporated here by reference.

BRIEF DESCRIPTION OF THE DRAWINGS

The features and advantages of the invention will be appreciated upon reference to the following drawings. The accompanying drawings, which are incorporated in and constitute a part of this specification, illustrate one or more embodiments of the invention and, together with the general description given above and the detailed description given below, explain the one or more embodiments of the invention

DETAILED DESCRIPTION OF THE INVENTION

Figure 1:
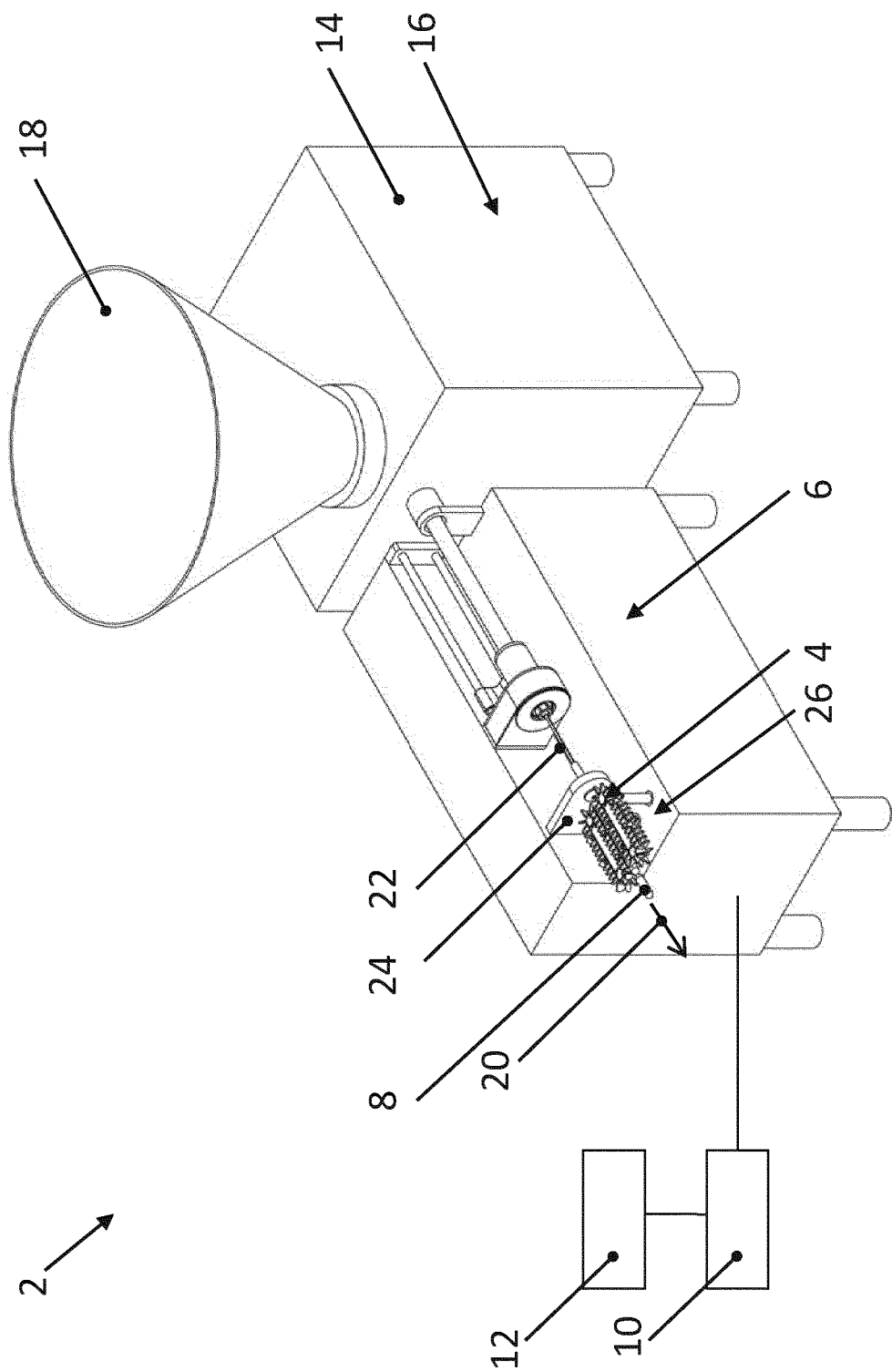
FIG. 1 shows a perspective view of a system for stuffing tubular casings according to one embodiment of the invention.
Figure 2:
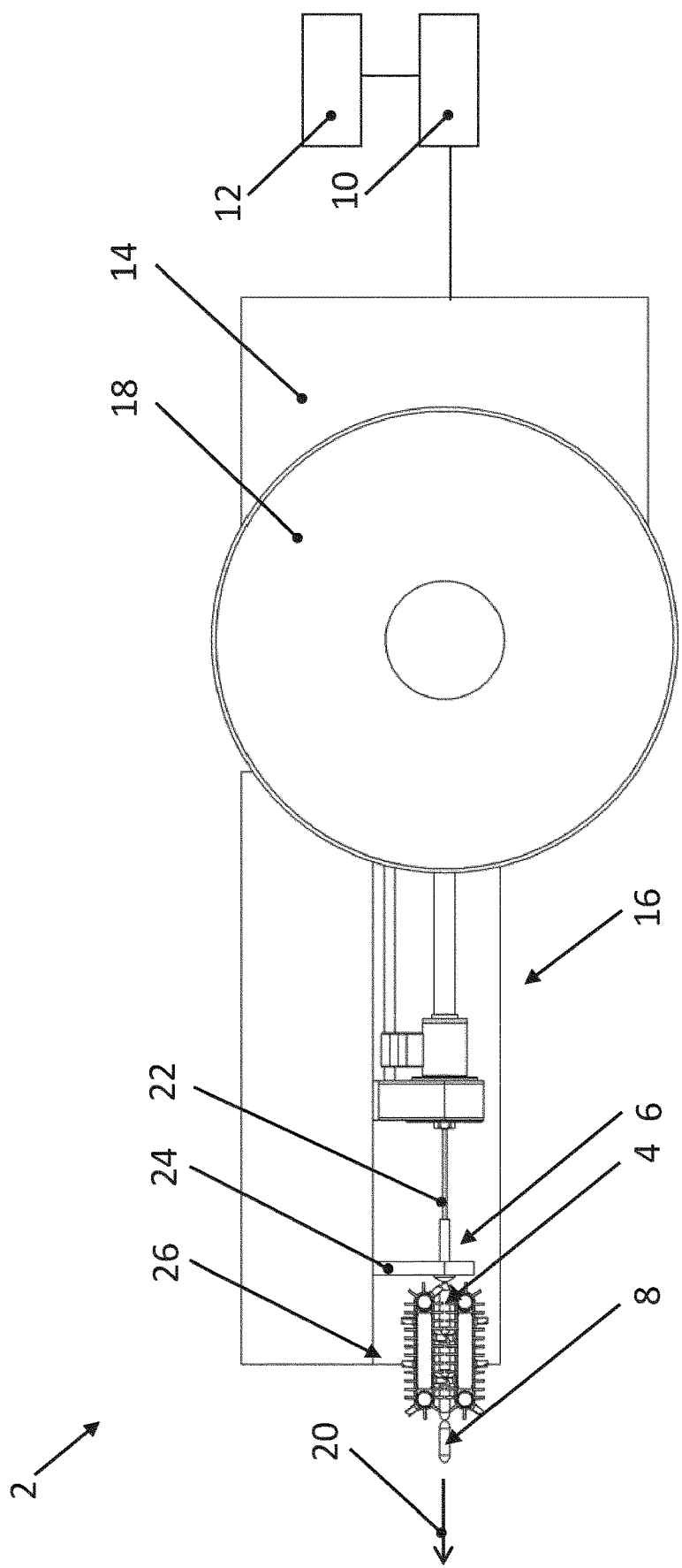
FIG. 2 shows a top view of the system shown in FIG. 1.

FIGS. 1 and 2 show a system 2 for producing portions from a tubular casing 4 stuffed with a food mass, the system comprising a stuffing machine 14 having a feeding hopper 18 for receiving the food mass and a feed pump 16, a twist linking device 6 having a stuffing tube 22 for stuffing the food mass into the tubular casing 4, and a portioning device 26.

Stuffing tube 22 can be driven rotatingly about its longitudinal axis. Twist linking device 6 also has a casing brake 24, which has a casing brake ring (not shown) that can be rotated and driven synchronously with the stuffing tube 22. Stuffing tube 22 ends in the region of the casing brake ring. In operation, a pasty food mass, such as sausage meat, in particular, is dispensed into the tubular casing 4 to be stuffed and is further processed by portioning device 26. By means of twist linking device 6 and portioning device 26, single portions are produced, in particular single sausage portions 8 or similar food products of equal length.

Portioning device 26 has dividers 32 (not shown, cf. FIG. 3) which constrict the stuffed tubular casing 4. Due to the rotation of the stuffed tubular casing 4 about its longitudinal axis and the engagement of the dividers 32, the rotation is reduced in the region of an engagement point, and a twist point 40 is formed. For a more detailed view, reference is again made to FIG. 3.

System 2 also has a control unit 10, which is connected in data communication to a user interface 12. Twist linking device 6 is configured to twist the tubular casings 4 to form portions P, in particular sausages 8, having a variable number of twists R per portion P. The features of the method according to the invention are illustrated in FIGS. 4 to 7. Control unit 10 is configured to perform the features of the method described below.

Figure 3:
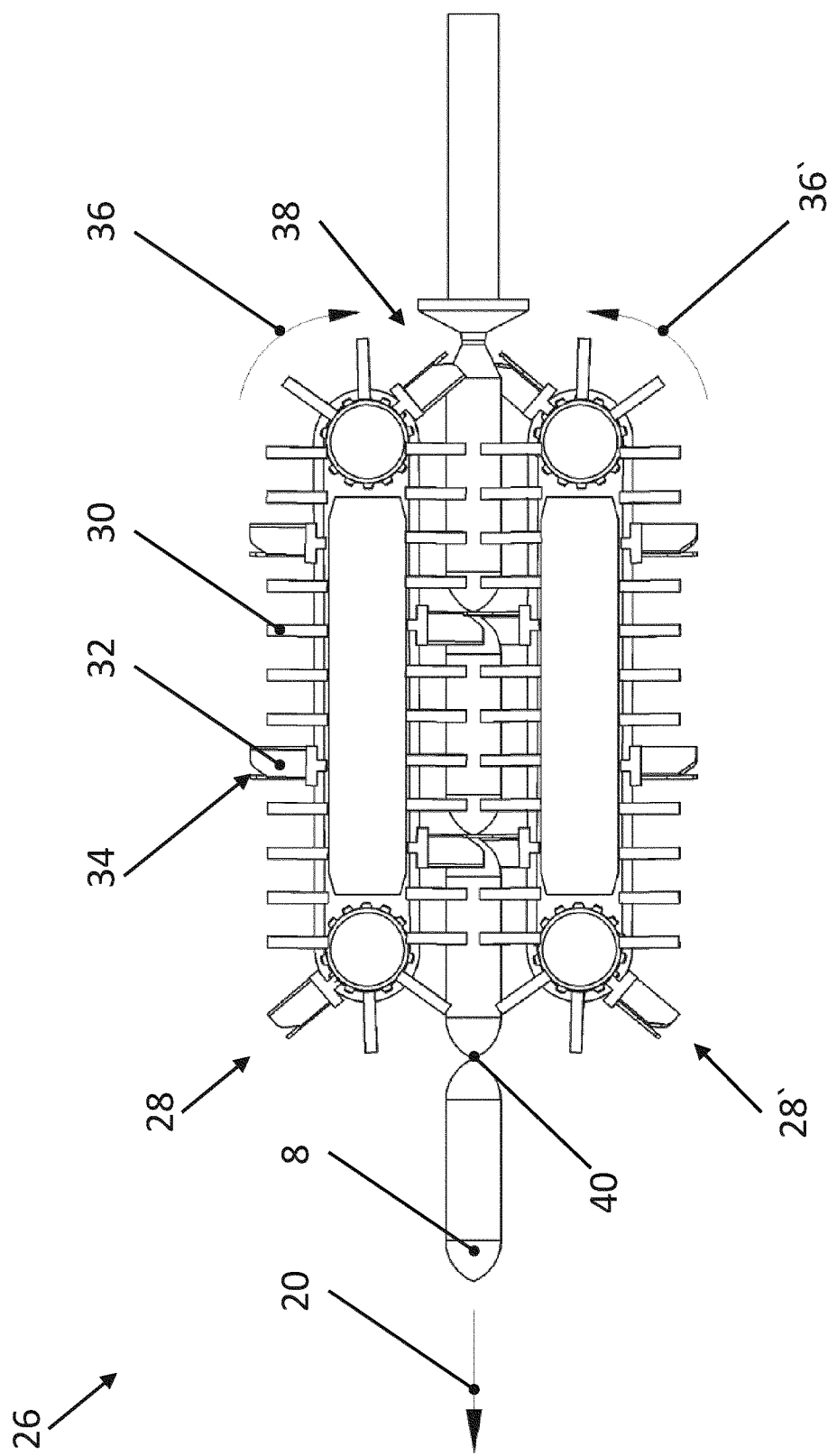
FIG. 3 shows an enlarged top view of a portioning device of the system shown in FIGS. 1 and 2.

The portioning device 26 shown in FIG. 3 includes two conveyor belts 28, 28' having a plurality of guide members 30 mounted thereon and some dividers 32 mounted on conveyor belt 28, 28'. Conveyor belts 28, 28' are made of a flexible material or are embodied alternatively as chains, and they move synchronously in the direction shown by arrows 36, 36'. Sausage portions 8 are conveyed in a conveying direction 20.

Guide members 30 project laterally from conveyor belts 28, 28' and preferably have a semi-circular recess 34 adapted to the substantially cylindrical contour of sausage portions 8 so that the portions 8 that are formed are supported and guided. Due to the contact between guide members 30 and tubular casing 4, tubular casing 4 is braked in its rotation.

At specific distances from each other, which correspond approximately to the length of a sausage portion 8, the dividers 32 projecting laterally from the conveyor belts are arranged in such a way that two substantially opposite and synchronously driven dividers 32 can always cooperate in such a way that they move in deflection region 38 towards the stuffed tubular casing 4 and come into contact with it and form or begin to form a constriction point and a twist point 40.

Figure 4:
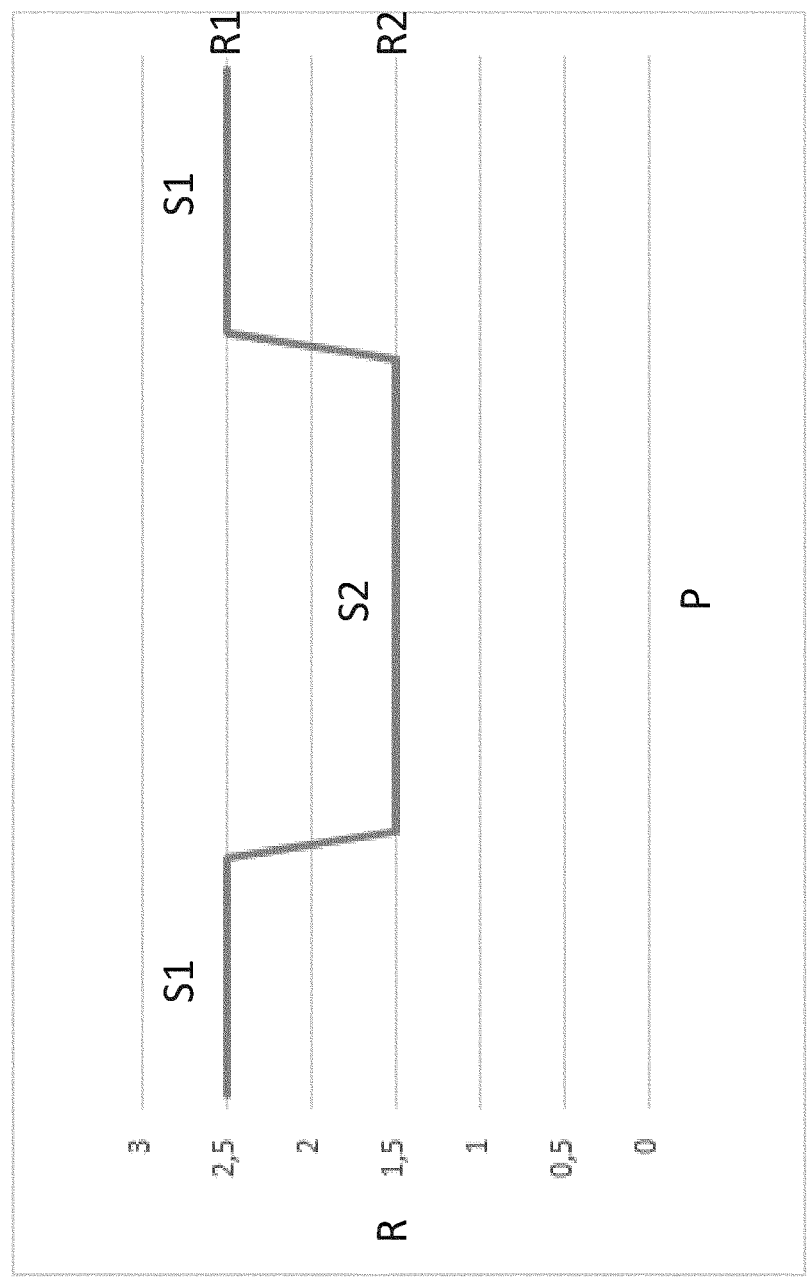
FIGS. 4 to 9 are diagrams of different sequences in a method for twist linking tubular casings according to one embodiment of the invention.
Figure 5:
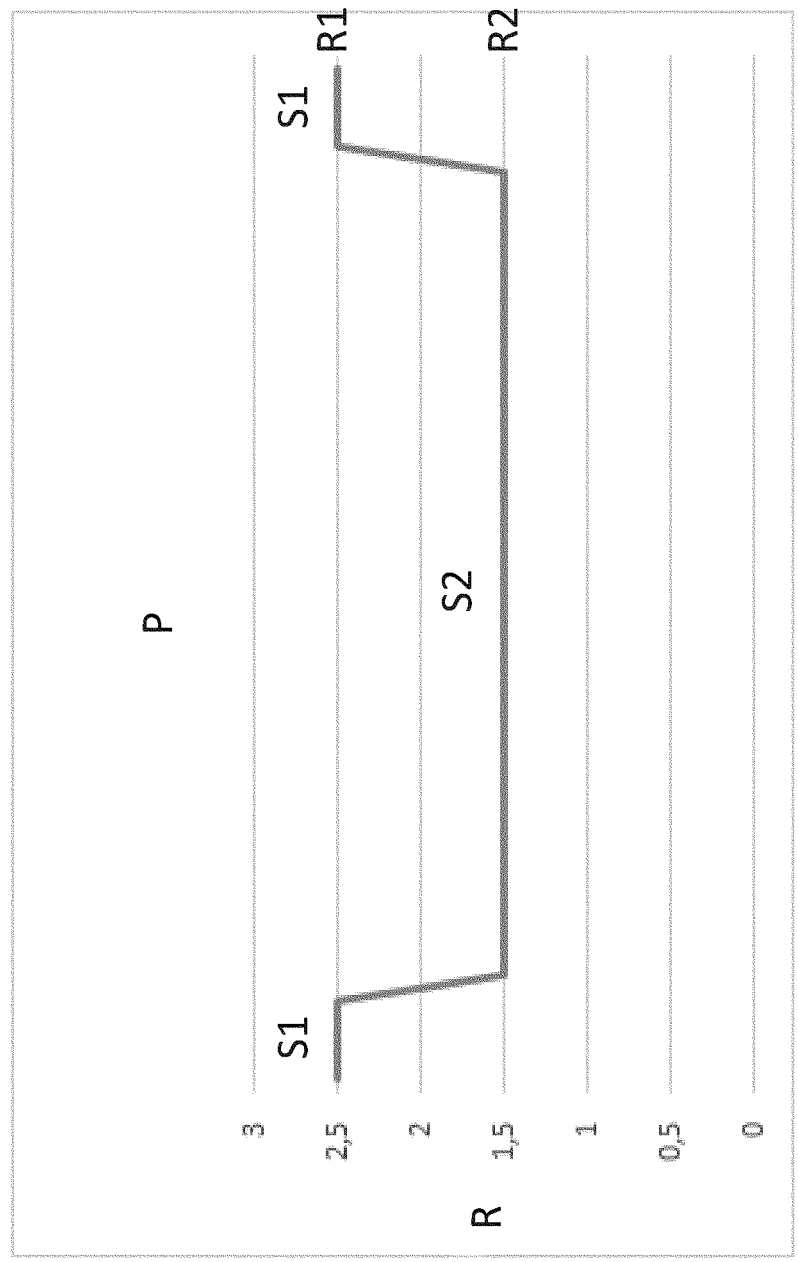

As can be seen from FIGS. 4 and 5, the apparatus is designed and operated such that tubular casing 4 is twist-linked in such a way that the number of twists R per portion P or per group of portions P is varied during the processing of a tubular casing 4. The number of twists R per portion P or per group of portions P is plotted on the vertical axis. The individual portions P that can be formed from a tubular casing 4 are plotted on the horizontal axis. As can be seen from FIG. 4, for example, the number of twists R varies in relation to the portions P that can be generated from a casing 4. As can be seen from FIG. 4, the number of twists R per portion or per group of portions P is in a range from 1.5 twists to 2.5 twists but is not limited to that numerical range and may typically be in a range from 0.5 twists to 15 twists. The number of twists R per portion P or per group of portions P is varied in such a way that a first sequence of twist operations S1 is performed with a first number of twists R1 and a second sequence of twist operations S2 is performed with a second number of twists R2. The number of portions P per sequence S is variable. Immediately after the processing of a tubular casing 4 begins, the first sequence S1 runs. After sequence S1 has ended, sequence S2 runs, after which sequence S1 runs again. The number of twists R1 in the first sequence S1 is 2.5 and in the second sequence S2 it is 1.5.

As shown with reference to FIG. 5, the first sequence S1 runs during the processing of the first approximately 5% and last approximately 5% of portions P of a tubular casing 4, relative to the total number of portions P. As shown in FIG. 4, this percentage may also be significantly larger, for example in the range of 25% in each case. An absolute number of portions P for which the first sequence S1 runs may also be specified. For example, the first sequence S1 may run for the first and last 5 to 15 portions P, in particular for the first and last 10 portions P.

Figure 6:
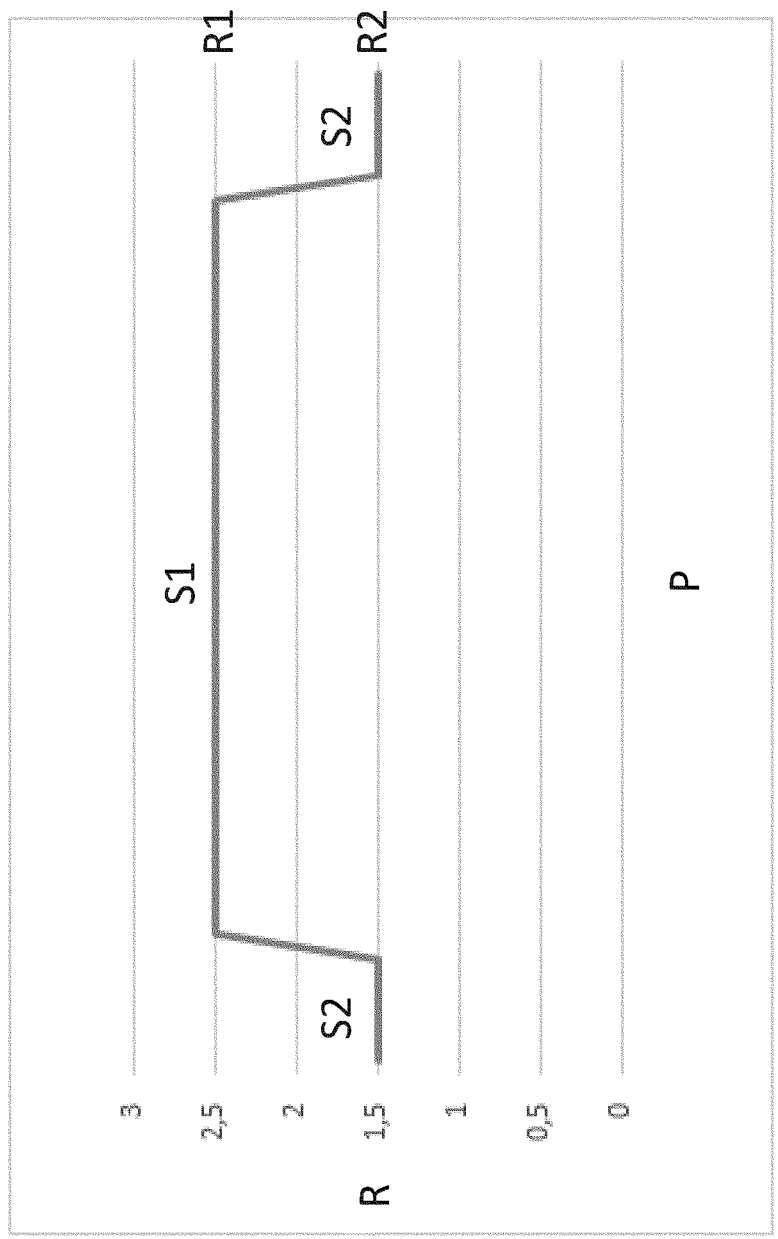

An alternative method is shown in FIG. 6. According to this method, the second sequence S2 runs immediately after the processing of a tubular casing 4, followed by the first sequence S1 and then by the second sequence S2. In other words, the first portions P of a tubular casing 4 are initially twist-linked with 1.5 turns, the following portions P with 2.5 twists and the last portions P of casing 4 with 1.5 twists.

Figure 7:
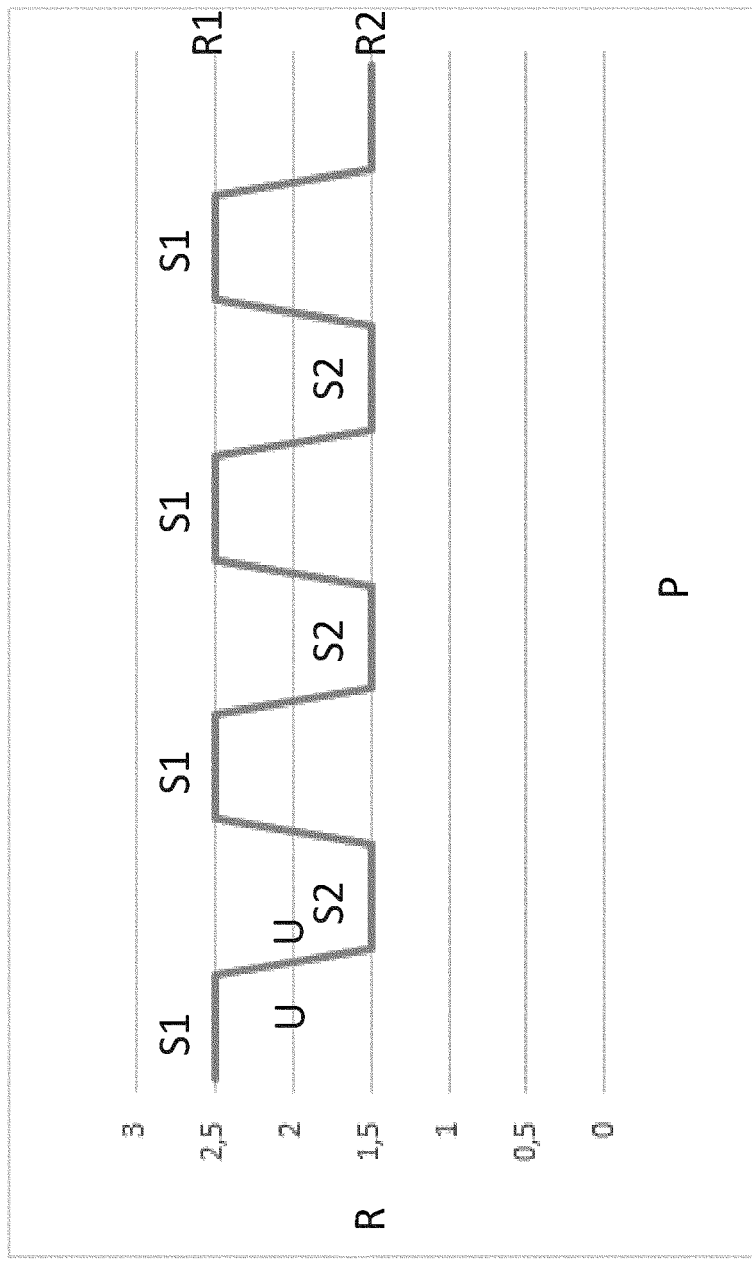

Another alternative procedure is shown in FIG. 7. As can be seen from FIG. 7, the first sequence S1 and the second sequence S2 run alternately, in particular with multiple alternations. In other words, when the processing of a tubular casing 4 begins, a twist link with 2.5 turns is firstly made, as can be seen from sequence 1, then a twist link with 1.5 turns, as can be seen from sequence S2, followed by another twist-link with 2.5 turns, etc.

With reference to FIG. 7, it is also illustrated that a transition region U in which the number of twists R transitions linearly or non-linearly from the number of twists R1, R2 in the first sequence S1, S2 bordering the transition region to the number of twists R1, R2 in the second sequence S1, S2 bordering the transition region U is arranged between two sequences S1, S2. With reference to FIG. 7, in the sequence S1 shown on the left there is no abrupt transition to sequence S2 after the twist linking of a last portion P, but rather a portion P between sequences S1 and S2 is twist linked with two twists, for example. Transition region U may include one portion P or a plurality of portions P.

Figure 8:
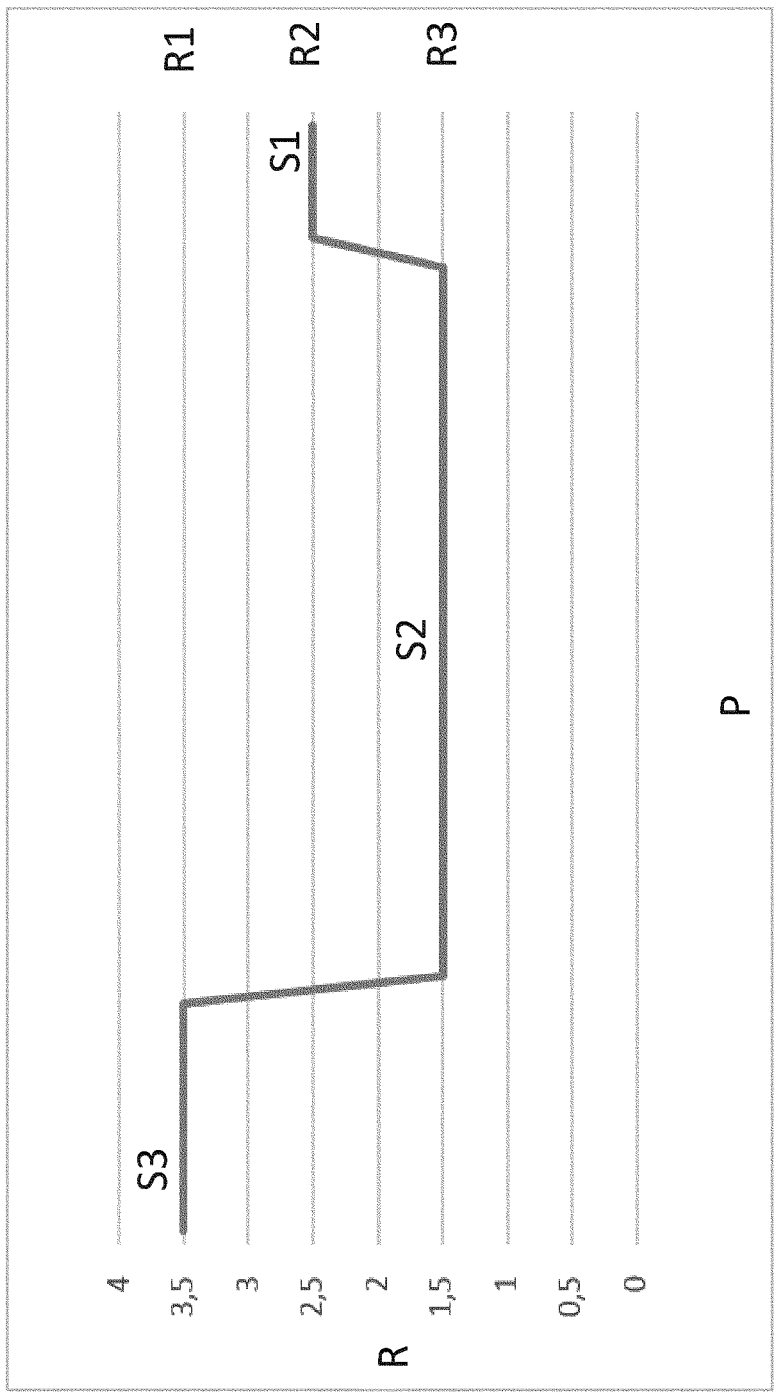
Figure 9:
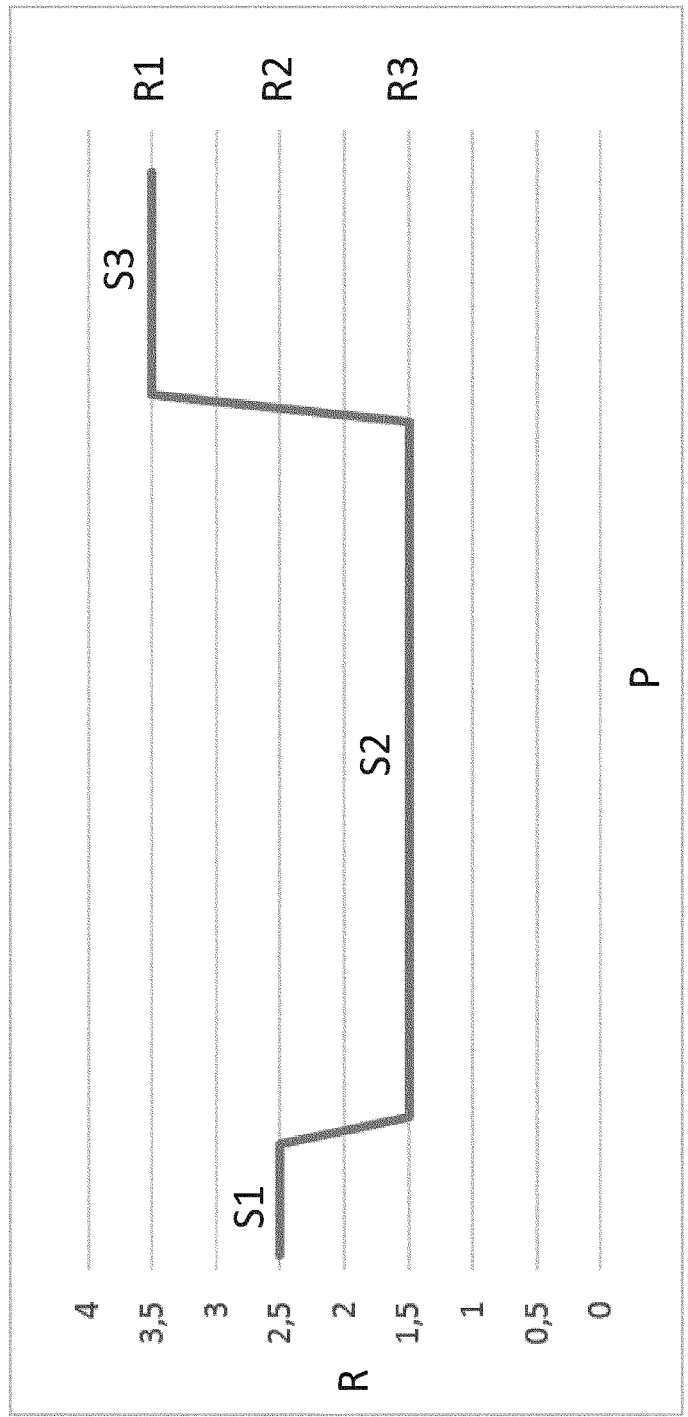

Another alternative procedure is shown in FIG. 8. As can be seen from FIG. 8, when a tubular casing is processed a sequence S3 firstly runs for a plurality of portions P with 3.5 twists R1, then a sequence S2 with 1.5 twists R3 and finally a sequence S1 with 2.5 twists R2. According to an alternative procedure, sequences S1 to S3 may also run in reverse order, as shown in FIG. 9. During the processing of a tubular casing, it is also possible for a group or multiple groups of portions to be twist linked with an alternative number of twists R within one or more other sequences S (not shown). The number of portions P per sequence may also be varied, for example.

The series of twisting sequences S1, S2, S3 and other sequences S, the characteristics of transition regions U and/or the number of twists R1, R2, R3 and other numbers of twists R within sequences S1, S2, S3, S, and the number of portions P per sequence S1, S2, S3, S may be defined in a variety of ways by means of user interface 12 shown in FIGS. 1 and 2, or may be stored in control unit 10. User interface 12 is connected in data communication to control unit 10. Control unit 10 performs the method according to the invention jointly with twist linking device 6 and portioning device 26.

The embodiments described above are descriptions of preferred embodiments of the present invention, and are not intended to limit the scope of the present invention. Various variations and modifications can be made by those of ordinary skill in the art, without departing from the design and scope of the present invention. The variations and modifications should all fall within the claimed scope defined by the claims of the present invention.

LIST OF REFERENCE SIGNS

2 Stuffing system
4 Tubular casing
6 Twist linking device
8 Sausage portion
10 Control unit
12 User interface
14 Stuffing machine
16 Feed pump
18 Feeding hopper
20 Conveying direction
22 Stuffing tube
24 Casing brake
26 Portioning device
28, 28' Conveyor belt
30 Guide member
32 Divider
34 Recess
36, 36' Direction of divider movement
38 Deflection region
40 Constriction point/twist point
R Number or twists
R1 First number of twists
R2 Second number of twists
R3 Third number of twists
R Number or twists
S1 First sequence
S2 Second sequence
S3 Third sequence
S Further sequence or sequences
P Portion
U Transition region

What is claimed is:

1. A method for twist linking tubular casings, comprising:
twisting a tubular casing such that the number of twists per group of portions is varied during the processing of a tubular casing,
wherein the number of twists per group of portions is varied in such a way that a first sequence of twist operations is performed with a first number of twists and a second sequence of twist operations is performed with a second number of twists,
wherein the first sequence runs immediately after the processing of a tubular casing begins and is followed by the second sequence,
wherein when the processing of a tubular casing ends, the first sequence runs again, and
wherein the first sequence has a higher number of twists than the second sequence.

2. The method according to claim 1, wherein the number of twists in the first sequence is 0.5 twists to 15 twists.

3. The method according to claim 1, wherein the number of twists in the second sequence is 0.5 twists to 15 twists.

4. The method according to claim 1, wherein, in relation to the total number of portions in a tubular casing, the first sequence runs during the processing of the first and/or last 1% to 15% of the portions.

5. The method according to claim 1, wherein the first sequence runs for the first and/or last 5 to 15 portions.

6. The method according to claim 1, wherein a transition region in which the number of twists transitions linearly or non-linearly from the number of twists in the first sequence bordering the transition region to the number of twists in the second sequence bordering the transition region is arranged between two sequences.

7. The method according to claim 1, further comprising:
defining by means of a user interface a series of twisting sequences and/or the number of twists within the sequences.

8. An apparatus for twist linking tubular casings, which is configured to twist the tubular casings to form portions having a variable number of twists per portion or per group of portions, the apparatus comprising:
a control unit configured to perform the method according to claim 1.

9. A system for stuffing tubular casings, comprising:
a stuffing machine for providing a pasty mass;
an apparatus for twist linking the stuffed tubular casings; and
a portioning device for forming sausage portions,
wherein the apparatus is designed according to claim 8.

* * * * *